United States Patent
Scales et al.

(10) Patent No.: US 6,374,285 B1
(45) Date of Patent: Apr. 16, 2002

(54) METHOD FOR MUTUAL EXCLUSION OF LOCKS IN A REMOTE-WRITE GLOBALLY ORDERED NETWORK OF PROCESSORS

(75) Inventors: Daniel J. Scales, Mountain View; Leslie Lamport, Palo Alto, both of CA (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/079,540

(22) Filed: May 15, 1998

(51) Int. Cl.$^7$ ............................................. G06F 9/52
(52) U.S. Cl. ........................................ 709/104; 710/200
(58) Field of Search .................. 710/200, 52, 108, 710/220, 240, 241, 242, 243, 244; 709/100–108

(56) References Cited

U.S. PATENT DOCUMENTS

| | | | | |
|---|---|---|---|---|
| 5,068,781 A | * | 11/1991 | Gillett, jr. et al. | 710/108 |
| 5,553,298 A | | 9/1996 | Merryman | 709/104 |
| 5,615,374 A | * | 3/1997 | Sadoi et al. | 710/200 |
| 5,699,500 A | * | 12/1997 | Dasgupta | 714/1 |
| 5,706,515 A | * | 1/1998 | Connelly et al. | 709/106 |
| 5,922,057 A | * | 7/1999 | Holt | 710/52 |
| 5,987,492 A | * | 11/1999 | Yue | 709/102 |
| 5,991,845 A | * | 11/1999 | Bohannon et al. | 710/200 |
| 6,018,795 A | * | 1/2000 | Boudou et al. | 712/32 |
| 6,161,162 A | * | 12/2000 | DeRoo et al. | 710/244 |
| 6,192,514 B1 | * | 2/2001 | Lurndal | 717/6 |

OTHER PUBLICATIONS

Freudenthal et al., "Process Coordination with Fetch–and–Increment," ACM, pp. 260–268, 1991.*

Kushilevitz et al., "Randomized Mutual Exclusion Algorithms Revisited," ACM, pp. 275–283, 1992.*

Coulouris et al., "Distributed System Concepts and Design," second edition, Addison–Wesley, Chapter 13, pp. 377–408, 1994.*

Bach, Maurice J., "The Design of the Unix Operating System," Prentice Hall, Chapter 12, pp. 391–411, 1990.*

J,M, Mellor–Crummey and M.L. Scott, "Algorithms for Scalable Synchronization On Shared–Memory Multiprocessors," ACM Transactions on Computer Systems, vol. 9, No. 1, pp. 22–47, Feb. 1991.*

Thomas E. Anderson, "The Performance of Spin Lock Alternatives for Shared–Memory Multiprocessors,"IEEE Transactions on Parallel and Distributed Systems, vol. 1, No. 1, pp. 6–16, Jan. 1990.*

Gary Graunke and Shreekant Thakkar, "Synchronization Algorithms for Shared–Menory Multiprocessors," IEEE, pp. 60–69, Jun. 1990.*

Leslie Lamport; "A Fast Mutual Exclusion Algorithm"; ACM Transactions on Computer Systems; vol. 5, No. 1; pp. 1–11; 1987.

* cited by examiner

*Primary Examiner*—St. John Courtenay, III
(74) *Attorney, Agent, or Firm*—Leah Sherry Oppenheimer Wolff & Donnelly

(57) ABSTRACT

The invention provides a method for acquiring a lock in a network of processors with globally ordered remote-writes. A process requesting a lock changes an associated ticket number from zero to one. Next, the process determines if every other process attempting to acquire the lock has a ticket number of zero. If true, the request for the lock is immediately granted. Otherwise, if false, the process changes its ticket number to a value greater than that of every other process, and the process waits until its ticket number is the lowest non-zero ticket number, in which case the lock is granted with mutual exclusion.

16 Claims, 3 Drawing Sheets

METHOD FOR MUTUAL EXCLUSION OF LOCKS IN A REMOTE-WRITE GLOBALLY ORDERED NETWORK OF PROCESSORS

FIELD OF THE INVENTION

This invention relates generally to granting mutual exclusion to processors during memory accesses, and more particularly to granting mutual exclusion to processors in a remote-write globally ordered network of processors.

BACKGROUND OF THE INVENTION

There has been much work in implementing fast mutual exclusion on computer systems that support a variety of capabilities in hardware. Most work has focused on a network of multi-processors where all processors can access a shared memory via some interconnect. The processors' view of the shared memory is usually kept consistent according to a particular memory consistency model, such as sequential consistency. For example, given sequential consistency, a number of algorithms are known, such as Decker's algorithm, Lamport's Bakery algorithm, Peterson's algorithm, and Lamport's 1-bit algorithm. Typically, these algorithms obtain mutual exclusion with respect to a named object known as a lock, so "acquiring a lock" expresses the concept of obtaining mutual exclusion for a process.

These algorithms have varying properties, such as whether they generalize easily to more than two processes, whether processes can get "starved", how many reads and writes they do in the common case, and so forth. Please see, E. W. Dijkstra "Solution of a problem in concurrent programming control," Communications of the ACM, Vol. 8, No. 9, p. 569, September 1965; Leslie Lamport "A new solution of Dijkstra's concurrent programming problem", Communications of the ACM", Vol. 17, No. 8, pp. 86–88, August 1974; Leslie Lamport "The Mutual Exclusion Problem: Part II—Statement and Solutions", Journal of the ACM, Vol. 33, No., 2, pp. 327–346, April 1986; and G. L. Peterson "A new solution to Lamport's concurrent programming problem" ACM Transactions on Programming Languages and Systems, Vol. 5, No. 1, pp. 56–65, January 1983.

U.S. Pat. No. 5,553,298 "Method and apparatus for mutual exclusion in self-directed distributed systems" issued to Merryman on Sep. 3, 1996 describes a method of mutual exclusion between processes connected by a network. There, mutual exclusion is achieved by having the processors broadcast their interest in obtaining a lock. However, the method uses a simple back-off system where processors keep backing off until only one process is expressing an interest. The method uses time constants in the network to determine how long a process must wait after expressing an interest before it can be sure that it has the lock. The problem with that method is that in modem networks, time "constants" may change over time.

In shared memory systems, lock contention occurs when more than one process expresses an interest to acquire a particular lock at the same time. In a simple approach, this problem can be overcome by having a process write a value into an element of shared memory array to indicate that the process wants to acquire a lock. If there is no contention, then the process immediately gets the lock with just the single write access. However, when there is contention, all contending processes "back off" by zeroing their request from the corresponding elements of the array, and waiting a semi-random, and ever-increasing amount of time, and then trying again later until there is no contention. When there are many processes contending for the same lock, this back-off strategy can be very expensive, because processes can have repeated conflicts until they back-off for long amounts of time.

Therefore, there is a need for a mutual exclusion method that can acquire a lock with a single write access when there is no contention, yet the method would operate efficiently without back-off when there is contention. In addition, the method should grant locks to processes in a first-come, first-served "fair" manner that does not lead to "starvation" of individual processes.

SUMMARY OF THE INVENTION

The invention provides a method for acquiring a lock in a network of processors with globally ordered remote-writes. A process requesting a lock changes an associated ticket number from zero to one. Next, the process determines if every other process attempting to acquire the lock has a ticket number of zero. If true, the request for the lock is immediately granted. Otherwise, if false, the process changes its ticket number to a value greater than that of every other process, and the process waits until its ticket number is the lowest non-zero ticket number, in which case the lock is granted with mutual exclusion.

In one aspect of the invention, ticket numbers are integer values in the range from zero to a predetermined maximum integer value. Ticket numbers are assigned in order of lock requests.

In another aspect of the invention, the ticket number of the process is set to zero when the next available lowest ticket number is greater than the predetermined maximum integer value. In this case, the process restarts the process of acquiring the lock when the ticket numbers of all other processes requesting the lock are less than the predetermined maximum ticket number.

DETAILED DESCRIPTION OF PREFERRED EMBODIMENTS

Figure 1:
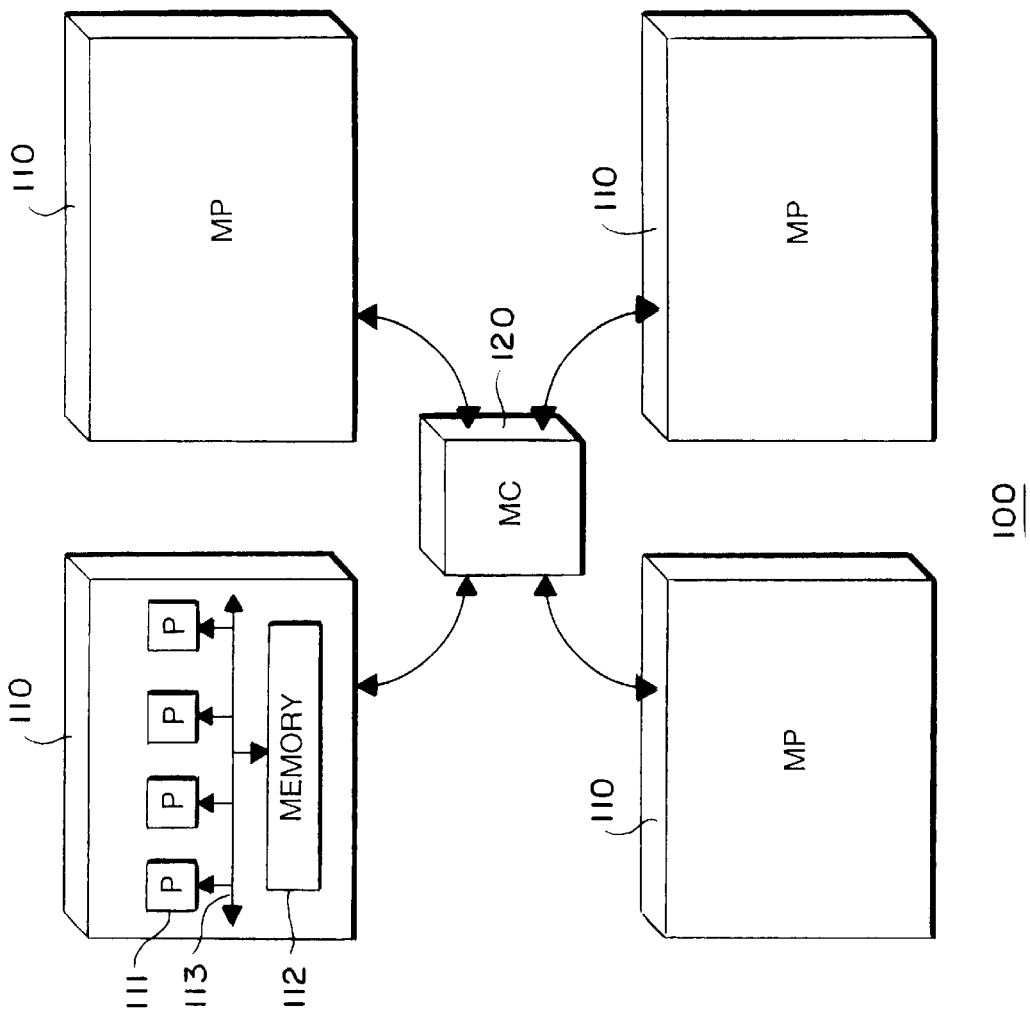
FIG. 1 is a block diagram of a network of multi-processors that uses the invention.

Our invention provides a method for mutual exclusion in a remote-write globally ordered network of processors as shown in FIG. 1. Multi-processors systems (MP) 110 are configured in a network 100. The interconnect can be provided, for example, by Digital Equipment Corporation's Memory Channel (MC) 120. Each system 110 can include a plurality (four, eight, twelve, or more) processors (P) 111 and a memory 112 connected by a bus 113. Portions of the memories 112 of the systems 110 can collectively be designated as a global "shared" memory. Global shared memory can be accessed by any processor via the Memory Channel 120. Local memories are accessible via the buses 113.

Mutual exclusion deals with the problem of granting locks for shared memory accesses in cases where multiple processes request a particular lock at the same time. As an advantage, the method according to our invention can acquire a lock with a single write access when there is no contention, yet the method operates efficiently without back-off when there is contention. In addition, our method grants locks to processes in a first-come, first-served "fair" manner that does not lead to "starvation" of individual processes. More particularly, our method works well in a globally ordered network where the interconnect is provided by a Memory Channel, or other hardware devices having similar properties.

Memory Channel Properties

The Digital Equipment Corporation Memory Channel 120 is a processor interconnect device that allows data to be sent between processors 111 (nodes) on the network 100 via simple stores (writes) to mapped pages of the shared memory. A page may be mapped as a transmit or receive region of the shared memory. Each mapped page has an associated unique identifier (ID). When a store is made to a transmit page, the data stored are automatically sent to all nodes that have a receive page with the identical ID. The one-way latency to send data between nodes is quite good, about 3 microseconds. All writes in the network are globally ordered, so that all nodes see network writes in the identical order.

The Memory Channel allows a process to multi-cast (or broadcast) data easily by setting up receive pages on several nodes corresponding to a single transmit page. The Memory Channel also handles the case where transmit and receive pages with the identical ID are on the same node. This is accomplished by sending data written by the node out to the Memory Channel and then looping the written data back to the original node, as well as sending the data to any other nodes that have receive pages with the identical ID.

If each process executing on one of the processors maintains transmit and receive pages on each node, all with the identical ID, then all updates to the page by any process will be sent to all other processes. Such a setup gives a basic form of shared memory across the Memory Channel when each process updates the data on the page using the transmit page and reads the data using the receive page.

This arrangement does not provide a standard (sequential) memory consistency model a priori. This is true because a process does not immediately see its own write until after the data are written to the network and looped back. However, a sequentially consistent memory can be emulated by having each node "stall," that is, suspend further execution, after the store to the transmit page, until its own store completes in its own receive page. Then, the store is guaranteed to have reached the Memory Channel.

The Memory Channel ensures that the store is globally ordered with respect to all other stores. Essentially, this arrangement implements an update-based, sequentially consistent shared memory using the Memory Channel. The fact that such an arrangement on the Memory Channel correctly implements sequential consistency can be derived from a theorem proved by Y. Afek et al. in "Lazy Caching" Toplas, Vol. 15, No. 1, pp. 182–205, January 1993.

As a consequence, it is possible to implement mutual exclusion on the Memory Channel by using any method that works for sequentially consistent shared memory. In this arrangement, reads are essentially free, because the reads to the receive pages are local reads. However, writes are expensive, since writes require waiting until the data have reached the Memory Channel and then are looped back to the local receive page. In addition, writes use up Memory Channel bandwidth. Therefore, it is desired to use a mutual exclusion implementation that minimizes the number of writes in the common case, i.e., there is no contention. As stated above, it is also desirable to reduce the total overhead when there is contention for a lock, and to avoid any approach based on back-offs.

Note that this observation that a sequentially-consistent globally shared memory can be implemented on a Memory Channel network assumes that the individual processors support the sequentially-consistent memory model. In cases where the processors support a more relaxed implementation than the sequential consistency, a process can enhance the mutual exclusion code as described herein with memory barrier type of instructions as required.

The Preferred Mutual Exclusion Method

Our approach modifies Lamport's Bakery algorithm noted above. This method handles lock contention without back-off and also grants mutually exclusive locks to processes in a first-come, first-served manner when there is contention. However, as originally designed, that method always requires three writes whether or not there is contention. We have modified that method to use only one write in the common case, and only two writes when there is contention. In addition, we also provide a solution for an overflow case that was not handled by the prior art method.

Figure 2:
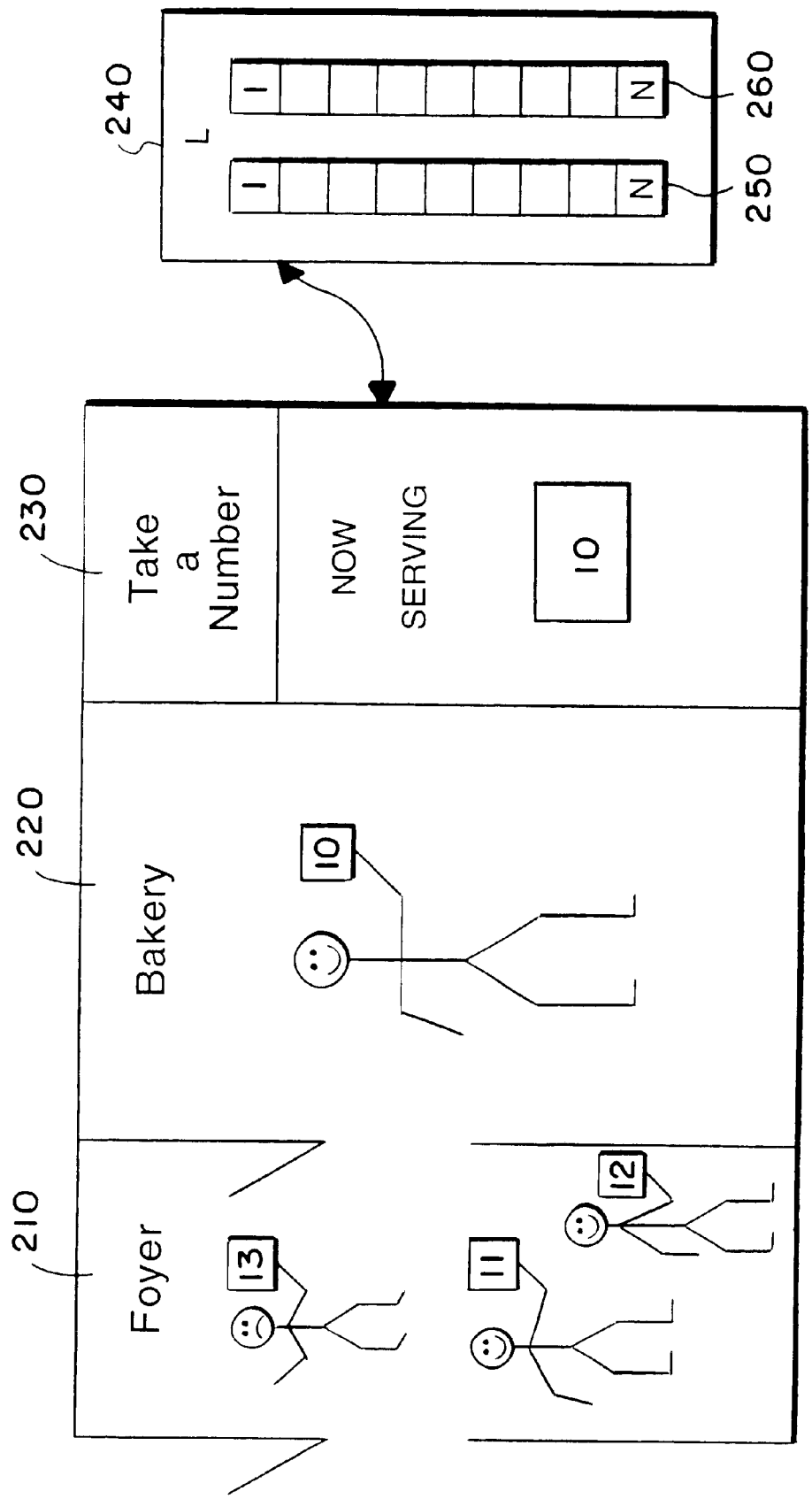
FIG. 2 is a diagram of a lock granting model used by a method according to the invention.

For clarity and comparison, the basic operation of the "Bakery" mutual exclusion model is described with reference to FIG. 2. Each customer (process) desiring service, e.g., acquiring a lock, enters a foyer 210. There, the customer takes a next lowest available ticket number as its ticket number. The bakery fairly hands out ticket numbers in a first-come first-served basis, i.e., ticket numbers are given in a sequential order by some machine 230.

Once a customer has received a ticket number, the customer leaves the foyer and enters the bakery 220. The bakery serves customers in order of their ticket numbers. Therefore, if the baker is "busy" serving a customer with a lower ticket number, then the customer waits (the process stalls) until it has the lowest ticket number in the bakery, in which case the bakery is ready to serve the customer with the lowest number. Of course, if the bakery is empty, then the customer can immediately proceed into the bakery 220 to be served.

The method which implements this can be specified in pseudo-code as shown below. Here, N is the number of processes that can acquire a lock L. The letter L represents a lock data structure 240 that is stored in shared memory as described above, i.e., mapped for transmit and receive on each node. The data structure L contains two arrays each with N elements, doorway (foyer) 250 and ticket 260. The doorway array 250 stores flags, and the ticket array 260 stores ticket numbers. The elements of the doorway and ticket arrays are set to zero when there is no contention. A value p identifies a process that wants to acquire the lock L. In the pseudo-code procedures below, the word "set" is used to indicate a sequentially consistent write. On the Memory Channel 120 of FIG. 1, this operation involves writing to the transmit page and waiting for the write to be reflected (looped back) in the corresponding local receive page of the process p. Write operations are indicated in bold typeface.

---

Basic Bakery Procedure

```
procedure
acquireLock(lock L, int p)
{
    int i, maxticket, ticket;
    set L.doorway[p]=1;
```

```
                    Basic Bakery Procedure for (i = 0, maxticket = 0; i < N; i++) {
        if(i != p) {
            ticket = L.ticket[i];
            if (ticket>maxticket)
                maxticket = ticket;
        }
    }
    set L.doorway[p]= 0;
    set L.ticket[p] = maxticket+1;
    for(i = 0;i<N;i++) {
        if(i != p) {
            while (L.doorway[i]!= 0)
                wait;
            while (TRUE) {
                ticket = L.ticket[i];
                if (ticket == 0 || ticket>L.ticket[p] ||
                        ticket == L.ticket[p] && i > p)
                    break;
                wait;
            }
        }
    }
}
```

The concept of the basic bakery procedure is that a process is granted mutual exclusion to a lock in the same way that customers are served in a bakery. In high-level terms, when a process tries to acquire a lock, the process "grabs" the next lowest available ticket number for that lock and then waits for its ticket number to be the lowest among all of the processes trying to acquire the lock.

More specifically, each process first sets a flag in the doorway array 250 indicating that it is in the foyer of the bakery, sets its own ticket number to 1 more than the largest ticket number that it currently observes in the ticket array 260, and then clears the flag indicating it is in the foyer. The process then waits for each other process to leave the foyer if it is there, i.e., the process waits for each process to compute its ticket number, and then waits until that process is gone from the bakery.

The use of the foyer is necessary to handle the case when the processes try to acquire lock at the same time. In this case, the processes will compute the same next ticket number. The use of the foyer ensures that each customer will see the ticket numbers of other customers in the bakery, and a tie can be resolved on the basis of, for example, processor identification numbers.

With our invention, we made the following modifications to the basic bakery model, see also, Lamport, in "A New Approach to Proving the Correctness of Multiprocess Programs," TOPLAS, Vol 1, No. 1, pp. 84–97, July, 1979.

i) we combined the doorway and ticket array into a single array (vector) by using a temporary ticket number of 1 to indicate that a process is in the foyer. With this change, our procedure only requires two writes (sets) for mutual exclusion. In addition, we changed the procedure so that when a process is in the foyer and notices that no other processes are in the doorway (foyer) of the bakery or the bakery itself, the lock can be granted to the process while it is staying in the doorway and holding the temporary ticket number of 1. With this change, only one write (set) is required in the non-contention case.

ii) we added a simple waiting mechanism to deal with the highly unlikely possibility of overflow in the ticket numbers. Overflow can only happen if there is continuous contention for a lock over a very long period of time, and ticket numbers are never reset.

Our modified bakery procedure is given below. Our data structure L 240 now contains only the single ticket array of N elements 260. Array 250 is no longer needed. A value MAXTICKET is the largest ticket value that can be stored in elements of the array L.ticket 260. As before, time-consuming network writes (sets) are indicated in bold.

```
                    Modified Bakery Procedure procedure
acquireLock(lock L, int p)
{
    int i, maxticket, ticket;
retry:
    set L.ticket[p] = 1;
    for (i = 0, maxticket = 0; i < N; i++) {
        if(i != p) {
            ticket = L.ticket[i];
            if (ticket > maxticket)
                maxticket = ticket;
        }
    }
    if (maxticket>0) {
        if (maxticket>= MAXTICKET) {
            set L.ticket[p]= 0
            wait until all L.ticket entries are less than
                MAXTICKET;
            goto retry;
        }
        set L.ticket[p]= maxticket + 1;
        for (i = 0; i < N; i++) {
            if(i != p) {
                while (TRUE) {
                    ticket = L.ticket[i];
                    if (ticket == 0 || ticket > L.ticket[p] ||
                            ticket == L.ticket[p] && i > p)
                        break;
                    wait;
                }
            }
        }
    }
}
```

Figure 3:
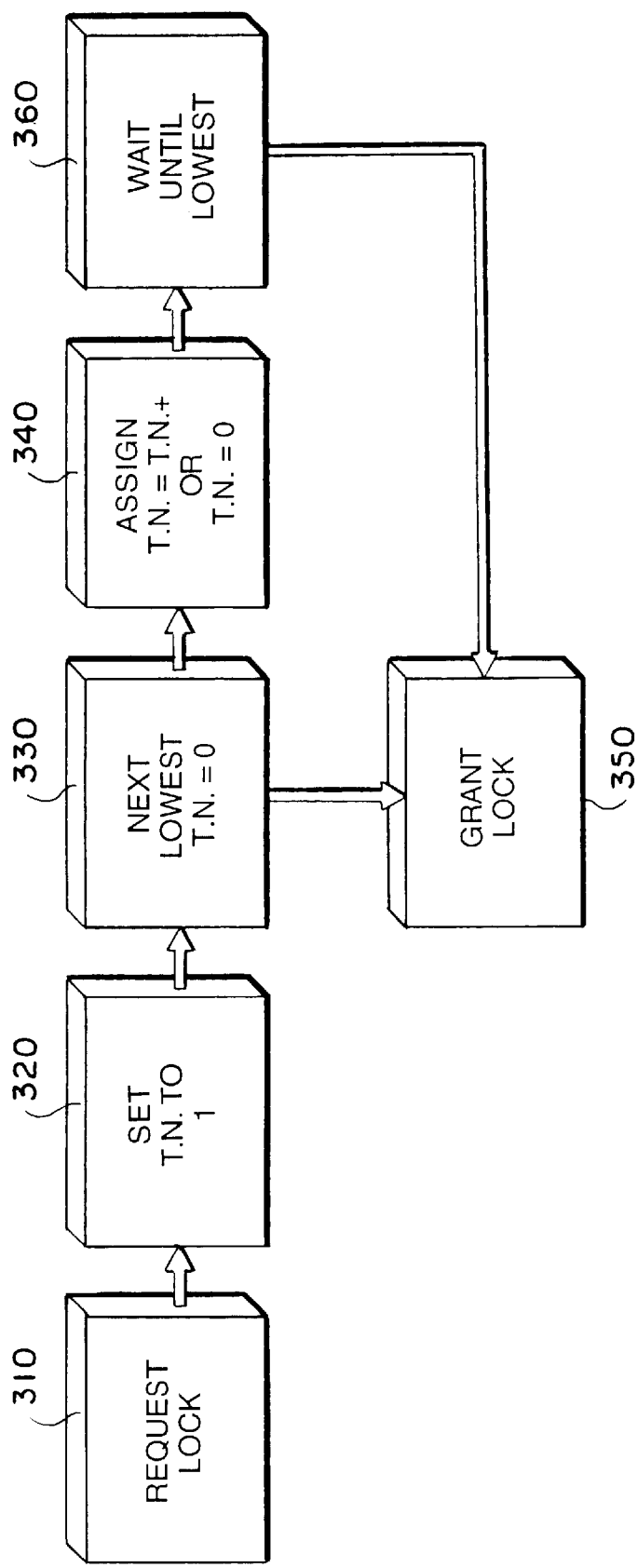
FIG. 3 is a flow diagram of a method that provides mutually exclusive locks according to the invention

The basic steps of our modified procedure are shown in FIG. 3. A process requesting a lock (step 310) temporarily sets L.ticket[p], its ticket number (TN) to 1 in step 320. The process then determines if the next lowest available ticket number, other than itself, is zero in step 330. If true, then the process keeps the ticket number of 1, and the lock is granted in step 340. In step 350, in the case when the next lowest ticket number is non-zero, the process assigns itself the next lowest ticket number plus one, unless this would cause the ticket number to overflow beyond the maximum possible ticket number. In step 360, the process waits until it holds the lowest possible ticket number, and the lock is then granted in step 340.

In the very unlikely case that the next lowest ticket number would be too large, the process sets its ticket number to zero in step 350 and waits until every other process has a ticket number less than the maximum possible ticket number. The process then restarts its attempt to acquire the lock. That is, the process again sets its ticket number to 1, and determines the next lowest available number.

In the common case of no contention, only one write is required. In the case of lock contention, two writes are used. Processes acquire the lock in the order in which they first tried to get the lock, and there is no possibility of starvation of a process. The first-come, first-served and non-starvation properties are potentially violated only in the extremely unlikely case of the ticket number overflow.

Note that overflow is only possible if a lock is continuously contended for a long time, i.e, if there is always at least one process waiting for the lock while another process holds the lock. If the elements of L.ticket are 32-bit values, and we assume that the lock is held on average for one microsecond by each process, then the ticket number could overflow after $2^{32}/(1,000,000*60)=71.6$ minutes of continuous contention. Because the Memory Channel network latency of 3 microseconds is required to release the lock to the next process requesting the lock, in practice, this time is an underestimate for the Memory Channel.

Another solution to the overflow problem, when the loss of the first-come, first-served property is a concern, is to increase the size of the elements of the L.ticket array 300. For example, if the L.ticket values are increased to 64-bit values, then the time to overflow becomes 71 minutes times $2^{32}$, a time much longer than the expected life of the network.

It should be understood that the above procedure is not specific to the Memory Channel. It can also be applied to any remote-write network which provides a global ordering among writes and supports loop-back. More generally, it is useful for any network that can be used to implement an update-based sequential consistency, where writes are expensive and reads are inexpensive.

Atomicity Properties

We have implicitly made the assumption above that the individual elements of the L.ticket array 300, i.e., the ticket numbers, are read and written atomically. That is, when multiple writes to the same element occur at the same time, the final value of the element is one of the writes, rather than some other value. In addition, when a read and a write of the same element occur simultaneously, the read obtains either the old value of the element or the new value, but not some other corrupted version.

As an extension, we can make an additional modification to our procedure that works when the unit of atomicity is smaller than the size of the elements of the L.ticket array. For example, this modification would allow the algorithm to work with 32-bit L.ticket elements, even if the underlying network only guarantees atomicity for writes of 8-bit (single byte) memory locations.

Our extension uses a technique for reading and writing large elements using smaller atomic reads and writes. In a system where the hardware provides only single byte (8-bit) atomic reads and writes, we wish to atomically read and write four byte (32-bit) quantities. The basic idea is to write the four byte value always from right to left, i.e., least significant byte first, and to read the four byte value always from left to write. The correctness of this extension is given by Lamport in "Concurrent Reading and Writing," CACM, Vol. 20, No. 11, pp. 806–811, November1977. The extension implies, among other things, that if a (four-byte) read occurs during a sequence of writes with monotonically increasing value, than the read will never see a value larger than any of the values written.

We have demonstrated that the modified bakery procedure above works using this method of reading and writing ticket elements, with just one change. The new ticket number chosen by a process should always have a non-zero least significant "digit," (the unit of atomic update—a byte in the above example). So, after a process determines the largest current ticket number MAXTICKET, the process chooses a larger ticket number with a nonzero least-significant digit, rather than using MAXTICKET+1. This change ensures that another process can never read a zero value when a process updates its temporary ticket number from 1 to its assigned ticket number.

Our invention makes mutually exclusive lock acquisition in a globally ordered network as efficient as possible. When there is no contention, acquiring mutual exclusion requires only one write operation. When there is contention, processes do only two network writes, and acquire mutually exclusive locks in order of their requests without any "backing-off".

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A method for acquiring a lock in a network of processors with globally ordered writes, the network of processors hosting a plurality of processes, each having a process identifier, the method comprising the steps of:

assigning an initial ticket number to a current process requesting a lock;

determining among the plurality of processes, other than the current process requesting the lock, a largest outstanding ticket number;

determining, based on the largest outstanding ticket number, whether there are other processes requesting the lock;

if there are no other processes requesting the lock, granting the lock to the current process; and if there are other processes, each having a ticket number, requesting the lock:

obtaining, for the current process, a successor ticket number to the largest outstanding ticket number;

determining that the successor ticket number of the current process is less than the ticket number of any other process requesting the lock or, the process identifier of the current process is less than the process identifier of any other process having a ticket number equal to the successor ticket number; and then granting the lock to the current process.

2. A method for acquiring a lock as recited in claim 1, wherein ticket numbers are integers and the initial ticket number is one.

3. A method for acquiring a lock as recited in claim 1, wherein the step of determining a largest outstanding ticket number includes:

setting the largest outstanding ticket number to zero; and for each process other than the current process:

obtaining a ticket number for the other process; and comparing the obtained ticket number of the other process against the largest outstanding ticket number and if the obtained ticket number of the other process is greater than the largest outstanding ticket number, updating the largest outstanding ticket number with the obtained ticket number.

4. A method for acquiring a lock as recited in claim 1, wherein the step of determining that the successor ticket number of the current process is less than the ticket number of any other process requesting the lock or, the process identifier of the current process is less than the process identifier of any other process having a ticket number equal to the successor ticket number includes, for each other process requesting the lock:

comparing the successor ticket number to the ticket number of the other process to determine which is the larger ticket number; and if the ticket number of the other process is greater than the successor ticket number, waiting until the successor ticket number is less than or equal to the ticket number of the other process.

5. A method for acquiring a lock as recited in claim 4, further including, if the ticket number of the other process is equal to the successor ticket number, waiting until the processor identifier of the current process is less than the other process.

6. A method for acquiring a lock as recited in claim 1,
wherein the network provides for atomic modification of the ticket number; and
wherein the steps of assigning and the step of obtaining a successor ticket number each include atomically changing the ticket number for the process requesting a lock.

7. A method for acquiring a lock as recited in claim 6, wherein the network provides for atomic modification of 32 bits and the ticket number is a 32 bit quantity.

8. A method for acquiring a lock as recited in claim 1,
wherein the network provides for atomic modification of a fixed unit of memory storage and the ticket number is an integer multiple of the fixed units of memory storage, including at least a least significant unit and a most significant unit; and
wherein the steps of assigning and the step of obtaining a successor ticket number each include atomically changing each of the fixed units of the ticket number for the process requesting the lock in the order of least significant unit to most significant unit.

9. A method for acquiring a lock as recited in claim 8, wherein the steps of (i) determining among the plurality of processes, other than the current process requesting the lock, a largest outstanding ticket number, and (ii) determining that the successor ticket number of the current process is less than the ticket number of any other process requesting the lock or, the process identifier of the current process is less than the process identifier of any other process having a ticket number equal to the successor ticket number, each include reading each of the fixed units of a ticket number in the order of most significant unit to least significant unit.

10. A method for acquiring a lock as recited in claim 8, wherein the fixed unit of memory is a byte.

11. A method for acquiring a lock as recited in claim 8, wherein the least significant unit of the ticket number is non-zero.

12. A method for acquiring a lock as recited in claim 1, wherein ticket numbers range from zero to a predetermined maximum integer number.

13. A method for acquiring a lock as recited in claim 12, further including, prior to obtaining a successor ticket number, the steps of:
determining whether the largest outstanding ticket number is equal to or greater than the predetermined maximum ticket number; and
if the largest outstanding ticket number is equal to or greater than a predetermined maximum ticket number, assigning a ticket number of zero to the current process, waiting until all outstanding ticket numbers are less than the predetermined maximum ticket number, and continuing at the step of assigning an initial ticket number to the current process.

14. A method for acquiring a lock as recited in claim 1,
wherein ticket numbers are integers; and
wherein the successor ticket number is one more than the maximum outstanding ticket number.

15. A method for acquiring a lock as recited in claim 1,
wherein ticket numbers are maintained in a vector; and
wherein each element corresponds to one of the processes and contains any outstanding ticket number for the process to which the element corresponds.

16. A method for acquiring a lock as recited in claim 1,
wherein the ticket number comprises multiple digits;
wherein the network provides atomic modification of one digit of the ticket number; and
wherein the successor ticket number is constrained to have a non-zero least significant digit.

* * * * *

UNITED STATES PATENT AND TRADEMARK OFFICE
CERTIFICATE OF CORRECTION

PATENT NO. : 6,374,285 B1  Page 1 of 1
DATED : April 16, 2002
INVENTOR(S) : Scales et al.

It is certified that error appears in the above-identified patent and that said Letters Patent is hereby corrected as shown below:

Column 5,
Line 18, reads "     if (ticket == 0 || ticket>L.ticket[p]||" should read
-- if (ticket = 0 || ticket>L.ticket[p]|| --

Line 19, reads "          ticket == L.ticket[p] && i> p)" should read
--                       ticket = L.ticket[p] && i > p) --

Column 7,
Line 12, reads "increase the size of the elements of the L.ticket array 300" should read
-- increase the size of the elements of the L.ticket array 260 --
Line 27, reads "individual elements of the L. ticket array, 300, i.e., the ticket" should read -- individual elements of the L. ticket array, 260, i.e., the ticket --.

Signed and Sealed this

Twenty-ninth Day of April, 2003

JAMES E. ROGAN
*Director of the United States Patent and Trademark Office*